United States Patent [19]
England et al.

[11] Patent Number: 5,126,553
[45] Date of Patent: Jun. 30, 1992

[54] BISTABLE OPTICALLY SWITCHABLE RESONANT-TUNNELING DEVICE AND ITS USE IN SIGNAL PROCESSING

[75] Inventors: Paul England, Atlantic Highlands, N.J.; John E. Golub, Jerusalem, Israel

[73] Assignee: Bell Communications Research, Inc., Livingston, N.J.

[21] Appl. No.: 619,067

[22] Filed: Nov. 28, 1990

[51] Int. Cl.$^5$ .............................................. H01J 40/14
[52] U.S. Cl. .................................... 250/211 J; 357/4
[58] Field of Search .................... 250/213 A, 211 J; 377/101; 357/30, 16, 4

[56] References Cited

U.S. PATENT DOCUMENTS

| | | | |
|---|---|---|---|
| 4,546,244 | 10/1985 | Miller | 250/211 |
| 4,754,132 | 6/1988 | Hinton et al. | 250/211 |
| 4,772,924 | 9/1988 | Bean et al. | 357/30 |
| 4,800,262 | 1/1989 | Lentine | 250/211 |
| 4,849,799 | 7/1989 | Capasso et al. | 357/34 |
| 4,853,753 | 8/1989 | Capasso et al. | 357/4 |
| 4,872,744 | 10/1989 | Abeles et al. | 350/356 |
| 4,959,534 | 9/1990 | Lentine et al. | 250/213 |
| 5,034,783 | 7/1991 | Chang et al. | 357/30 |

OTHER PUBLICATIONS

D. A. B. Miller et al., "Novel Hybrid Optically Bistable Switch: The Quantum Well Self–Electro–Optic Effect Device", *Applied Physics Letters*, Apr. 1984, vol. 45, pp. 13–15.

D. A. B. Miller et al., "Integrated Quantum Well Self–Electro–Optic Effect Device: 2×2 Array of Optically Bistable Switches", *Applied Physics Letters*, 1986, vol. 49, pp. 821–823.

D. A. B. Miller, "Quantum Wells for Optical Information Processing", *Optical Engineering*, May 1987, vol. 26, pp. 368–372.

I. Mehdi et al., "Novel Use of Resonant Tunneling Structures for Optical and IR Modulators", *Superlattices and Microstructures*, Mar. 1989, vol. 5, pp. 443–449.

I. Bar–Joseph et al., "Differential Absorption Spectroscopy of Charge Distributions in Double–Barrier Tunnel Structures", *Physical Review B*, 1990–1, vol. 41, pp. 3264–3267.

M. Wegener et al., "Absorption and Refraction Spectroscopy of a Tunable–Electron–Density Quantum–Well and Reservoir Structure", *Physical Review B*, 1990–1, vol. 41, pp. 3097–3104.

A. L. Lentine et al., "Symmetric Self–Electro–Optic Effect Device: Optical Set–Reset Latch", *Applied Physics Letters*, Feb. 1988, vol. 52, pp. 1419–1421.

A. L. Lentine et al., "Symmetric Self–Electrooptic Effect Device: Optical Set–Reset Latch, Differential Logic Gate, and Differential Modulator/Detector", *IEEE Journal of Quantum Electronics*, Aug. 1989, vol. 25, pp. 1928–1936.

M. E. Prise et al., "Module for Optical Logic Circuits Using Symmetric Self–Electrooptic Effect Devices", *Applied Optics*, May 1990, vol. 29, pp. 2164–2170.

S. K. Korotky et al., "Optical Intensity Modulation to 40 GHz Using a Waveguide Electro–Optic Switch", *Applied Physics Letters*, Jun. 1987, vol. 50, pp. 1631–1633.

(List continued on next page.)

*Primary Examiner*—David C. Nelms
*Assistant Examiner*—Que T. Le
*Attorney, Agent, or Firm*—Leonard Charles Suchyta

[57] ABSTRACT

For use, e.g., as a fast acting microminiature optical switch, modulator, or oscillator in integrated optics, a device is provided with a light-sensitive element (12–20) whose electrical state can be influenced optically. The element (12–20) includes electrically biased semiconductor layers (15–17) which form a resonant-tunneling structure, and the electrical state is switched by radiation (23, 25) having quantum-well bandgap energy. The change in electrical state is accompanied by a change in opacity or refractive index, permitting optical read-out (24, 26).

28 Claims, 10 Drawing Sheets

OTHER PUBLICATIONS

K. Wakita et al., "High-Speed Electrooptic Phase Modulators Using InGaAs/InAlAs Multiple Quantum Well Waveguides", *IEEE Photonics Technology Letters,* Dec. 1989, vol. 1, pp. 441–442.

J. E. Zucker et al., "Miniature Mach-Zehnder InGaAsP Quantum Well Waveguide Interferometers for 1.3 μm", *IEEE Photonics Technology Letters,* Jan. 1990, vol. 2, pp. 32–34.

J. E. Zucker et al., "Optical Waveguide Intensity Modulators Based on a Tunable Electron Density Multiple Quantum Well Structure", *Applied Physics Letters,* Mar. 1990, vol. 56, pp. 1951–1953.

L. L. Chang et al., "Resonant Tunneling in Semiconductor Double Barriers", *Applied Physics Letters,* Mar. 1974, vol. 24, pp. 593–595.

B. Ricco et al., "Physics of Resonant Tunneling. The One-Dimensional Double-Barrier Case", *Physical Review B,* Feb. 1984, vol. 29, pp. 1970–1981.

$E_C$ $E_V$ $E_C$ $E_V$

BISTABLE OPTICALLY SWITCHABLE RESONANT-TUNNELING DEVICE AND ITS USE IN SIGNAL PROCESSING

TECHNICAL FIELD

The invention is concerned with microminiature devices and their use in signal processing.

BACKGROUND OF THE INVENTION

As light, including near-infrared radiation, is finding increasing use as an information carrier in guided-wave telecommunications, there is growing interest in light-sensitive and light-influencing devices, e.g., detectors, modulators, and switches. Such devices are of interest further in computerized image processing and, potentially, in data processing in general. Of particular interest are semiconductor modulator devices based on a so-called quantum-confined Stark effect (QCSE), using a semiconductor quantum well with strong optical absorption at the wavelength of the quantum-well exciton, and with shifting of the exciton energy by means of an electric field. Often, for free-space optics as well as for wave-guided or integrated optics, structures are recommended which include a multitude of quantum wells so as to cumulate their optical effects.

One type of proposed devices, known as self-electro-optic effect devices (SEED), include a multi-quantum-well structure in a p-i-n diode; such devices are disclosed in U.S. Pat. No. 4,546,244, issued Oct. 8, 1985 to D. A. B Miller et al., U.S. Pat. No. 4,754,132, issued Jun. 28, 1988 to H. S. Hinton et al., U.S. Pat. No. 4,800,262, issued Jan. 24, 1989 to A. L. Lentine et al., and U.S. Pat. No. 4,959,534, issued Sep. 25, 1990 to A. L. Lentine et al., and they are the subject, e.g., of papers by D. A. B. Miller et al., "Novel Hybrid Optically Bistable Switch: The Quantum Well Self-electro-optic Effect Device", Applied Physics Letters 45 (1984), pp. 13-15, D. A. B. Miller et al., "Integrated Quantum Well Self-electro-optic Effect Device: 2×2 Array of Optically Bistable Switches", Applied Physics Letters 49 (1986), pp. 821-823, D. A. B. Miller, "Quantum Wells for Optical Information Processing", Optical Engineering 26 (1987), pp. 368-372, A. L. Lentine et al., "Symmetric Self-electro-optic Effect Device: Optical Setreset Latch", Applied Physics Letters 52 (1988), pp. 1419-1421, A. L. Lentine et al., "Symmetric Self-electrooptic Effect Device: Optical Set-reset Latch, Differential Logic Gate, and Differential Modulator/Detector", IEEE Journal of Quantum Electronics 25 (1989), pp. 1928-1936, and M. E. Prise et al., "Module for Optical Logic Circuits Using Symmetric Self-electrooptic Effect Devices", Applied Optics 29 (1990), pp. 2164-2170. Similar structures have been proposed as intensity modulators, phase modulators, and Mach-Zehnder interferometers for wave-guided optics; see, e.g., S. K. Korotky et al., "Optical Intensity Modulation to 40 GHz Using a Waveguide Electro-optic Switch", Applied Physics Letters 50 (1987), pp. 1631-1633, K. Wakita et al., "High-speed Electrooptic Phase Modulators Using InGaAs/InAlAs Multiple Quantum Well Waveguides", IEEE Photonics Technology Letters 1 (1989), pp. 441-442, J. E. Zucker et al., "Miniature Mach-Zehnder InGaAsP Quantum Well Waveguide Interferometers for 1.3 μm", IEEE Photonics Technology Letters 2 (1990), pp. 32-34, and J. E. Zucker et al., "Optical Waveguide Intensity Modulators Based on a Tunable Electron Density Multiple Quantum Well Structure", Applied Physics Letters 56 (1990), pp. 1951-1953.

In another line of investigation, electrical and optical effects have been studied extensively in quantum-well structures based on resonant-tunneling principles, the following being cited here as representative: L. L. Chang et al., "Resonant Tunneling in Semiconductor Double Barriers", Applied Physics Letters 24 (1974), pp. 593-595, B. Ricco et al., "Physics of Resonant Tunneling. The One-dimensional Double-barrier Case", Physical Review B 29 (1984), pp. 1970-1981, U.S. Pat. No. 4,849,799, issued Jul. 18, 1989 to F. Capasso et al., U.S. Pat. No. 4,872,744, issued Oct. 10, 1989 to J. H. Abeles et al., I. Mehdi et al., "Novel Use of Resonant Tunneling Structures for Optical and IR Modulation", Superlattices and Microstructures 5 (1989), pp. 443-449, I. Bar-Joseph et al., "Differential Absorption Spectroscopy of Charge Distributions in Double-barrier Tunnel Structures", Physical Review B 41 (1990), pp. 3264-3267, and M. Wegener, "Absorption and Refraction Spectroscopy of a Tunable-electron-density Quantum-well and Reservoir Structure", Physical Review B 41 (1990), pp. 3097-3104.

The invention described in the following is motivated by the desire for fast-acting microminiature optical switches, modulators, and oscillators which are particularly suited for inclusion in integrated-optics structures.

SUMMARY OF THE INVENTION

A device is provided with a light-sensitive element whose electrical state can be influenced optically; the element comprises semiconductor layers that form a resonant-tunneling structure, and electrical biasing means. The electrical state of the element can be switched by means of radiation at a sufficient level of intensity at the quantum-well bandgap energy or higher; such radiation may be supplied, e.g., via a semiconductor layer adjacent to the resonant-tunneling structure.

The change in electrical state is accompanied by a change in an optical property, e.g., opacity or refractive index, permitting optical read-out.

DETAILED DESCRIPTION

Figure 1:
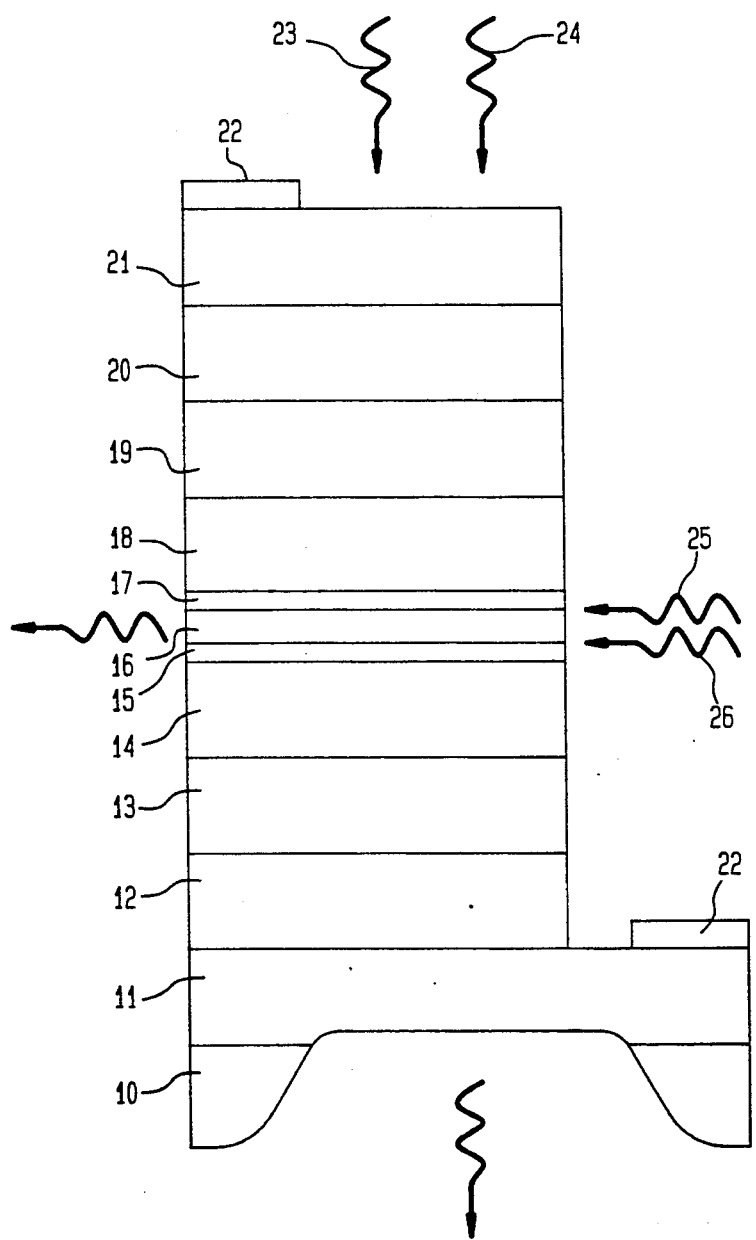
FIG. 1 is a schematic cross section of a preferred embodiment of the invention.

FIG. 1 shows substrate 10, semiconductor layers 11 through 21, contacts 22, and incident light beams 23, 24, 25, and 26. Typically, layers 11 through 21 are formed by successive steps of epitaxial deposition, e.g., by well-established molecular-beam-epitaxy or metal-organic-chemical-vapor-deposition methods. Contacts can be formed by evaporation. One or several light beams may be incident perpendicular or parallel to the layered structure, and other directions of incidence are not precluded.

Individual preferred features are further characterized as follows: A gallium arsenide substrate 10, a 2-micrometer layer 11 of $Al_{0.4}Ga_{0.6}As$, n-doped at $n=10^{18}/cm^3$, a 50-nanometer layer 12 n-doped at $n=10^{18}/cm^3$ and with composition $Al_xGa_{1-x}As$ linearly graded from $x=0.4$ at the interface with layer 11 to $x=0$ at the interface with layer 13, a 50-nanometer gallium arsenide layer 13 with n-dopant concentration linearly graded from $n=10^{18}/cm^3$ at the interface with layer 12 to $n=10^{17}/cm^3$ at the interface with layer 14, 50-nanometer layers 14 and 18 of gallium arsenide n-doped at $n=10^{17}/cm^3$, 4-nanometer undoped aluminum arsenide barrier layers 15 and 17, a 15-nanometer undoped gallium arsenide quantum-well layer 16, a 50-nanometer gallium arsenide layer 19 with n-dopant concentration linearly graded from $n=10^{17}/cm^3$ at the interface with layer 18 to $n=10^{18}/cm^3$ at the interface with layer 20 a 50-nanometer layer 20 n-doped at $n=10^{18}/cm^3$ and with composition $Al_xGa_{1-x}As$ linearly graded from $x=0$ at the interface with layer 19 to $x=0.4$ at the interface with layer 21, and a 500-nanometer layer of $Al_{0.4}Ga_{0.6}As$, n-doped at $n=10^{18}/cm^3$.

Compositional grading (combined with doping) in layers 12 and 20 is preferred for the sake of accommodation of the conduction-band discontinuity within the valence band. Wide-bandgap layers 11 and 21 may be included for the sake of mechanical strength and ease of fabrication in the case of a structure designed for light incidence perpendicular to the layered structure (23, 24). For light incident parallel to the layered structure (25, 26), layers 11, 12, 20, and 21 can serve as waveguiding layers.

The mesa shape of the structure was produced by etching, with a mesa diameter of approximately 500 micrometers. Contacts 22 were made of a gold-germanium alloy. Portions of substrate 10 and layer 11 were etched away for optical access, permitting radiation 23 and 24 to traverse the structure.

A gallium arsenide, aluminum gallium arsenide structure as described can be produced with excellent control, e.g., by molecular-beam epitaxy deposition. Bandgap energy is approximately 1.5 eV, corresponding to a wavelength of approximately 0.8 micrometer. Thus, such structure is particularly suitable for near-infrared applications. Other material choices are not precluded; for example, for wavelengths in the range from 1.3 to 1.5 micrometer, a preferred structure comprises an indium gallium arsenide quantum-well layer between indium phosphide barrier layers. (Wavelengths in this range are particularly important in long-haul optical communications via optical fibers, as silica-based fibers have an optical absorption minimum in this range.) Conveniently, for $In_{0.53}Ga_{0.47}As$ quantum-well layers, a corresponding structure can be produced lattice-matched on an indium phosphide substrate. Alternatively, for other material combinations, strained structures can be produced.

Another advantage of the indium gallium arsenide, indium phosphide system lies in possible compositional choice resulting in a well conduction-band energy below the injector energy, thereby permitting device operation at energies less than the injector energy. And, indium phosphide as a substrate material has the further advantage of being transparent at wavelengths of interest, so that substrate etching can be dispensed with in a structure analogous to the structure shown in FIG. 1.

To a certain degree, operating wavelength further depends on well width. More specifically, confined-state energies (which determine electrical and optical operation) are indirectly related to well width, so that a more narrow well has a higher transition energy. Also, more narrow wells have resonant states which are spaced more widely. The choice of barrier material is influenced by the desire for a thin, high-potential energy barrier. Furthermore, in the interest of permitting unimpeded current flow for device charging during switching, low effective barrier resistance is preferred. For high-speed operation a device impedance of approximately 50 ohms is convenient for matching to external circuitry.

Figure 2:
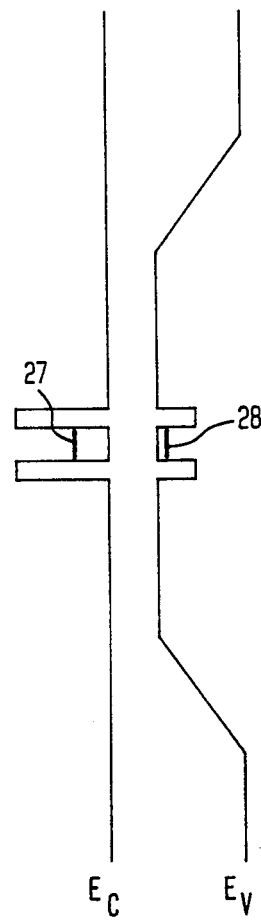
FIG. 2 is a representative energy-band diagram for the structure of FIG. 1.

FIG. 2, drawn alongside FIG. 1 for the sake of correspondence with the layered structure, shows an energy-band configuration for the structure of FIG. 1, with electron bound-state energy 27 and hole bound-state energy 28. (Bound states may also be called ground states.) As shown in FIG. 2, the bandgap $E_c-E_v$ is relatively narrow on both sides of the resonant-tunneling structure, so that movement of carriers involves interaction with a quantum state of such feature. Characteristically, in a resonant-tunneling structure comprising a quantum-well (16) delimited by barriers (15, 17), the ground-state energy of the quantum well is greater than the conduction-band energy in semiconductor material (14, 18) adjacent to the barriers. Preferred also is a conduction-band energy in the quantum-well layer 16 which does not exceed the conduction-band energy in layers 14 and 18. Preferably, for such adjacent semiconductor material (14, 18), layer thickness is significantly greater than the mean free path for optic phonon emission, e.g., at least twice such mean free path.

Figure 3:
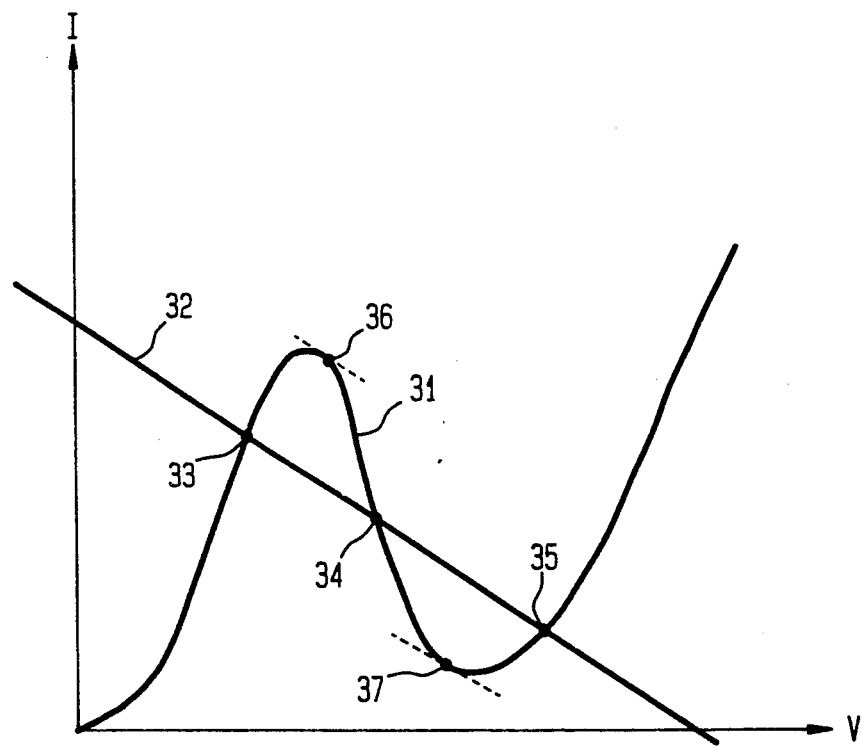
FIG. 3 is a representative current-voltage diagram for the structure of FIG. 1.

FIG. 3 shows current-voltage characteristic 31 representative of a preferred device structure in accordance with FIG. 1. Also shown is a load line 32 which intersects characteristic 31 at points 33, 34, and 35. (Corresponding to a load resistor with resistance R, connected in series with the device structure of FIG. 1, and to a voltage $V_0$ applied across the series-connected assembly, the slope of the load line is $-1/R$, and its intercept with the V-axis is $V_0$. When a current i flows through such assembly, a device-bias voltage is defined by $V_d = V_0 - iR$.) In the absence of a light pulse of suitable energy and intensity, the states corresponding to points 33 and 35 are stable. In accordance with an aspect of the invention it has been discovered that a bandgap light pulse of sufficient intensity can be used to switch the resonant-tunneling structure from a stable high-current state (33) to a stable low-current state (35) or vice-versa. More specifically, for device-bias voltages $V_d$ in a certain first range below an intrinsic switching point (36), the circuit will switch from an initial high-current state (33) to a low-current-state (35). Such low-current state will be maintained, with or without illumination, so long as the electrical bias is maintained. Conversely, for device-bias voltages $V_d$ in a certain second range above an intrinsic switching point (37), the low-current state (35) is stable until the structure is illuminated with a bandgap light pulse having sufficient intensity, at which point the structure switches to a high-current state (33). Again, the latter is stable independent of illumination so long as the electrical bias is maintained. For some device-bias voltages outside these first and second ranges the structure may be unstable in both high- and low-current states, and illumination may lead to oscillations.

Figure 4:
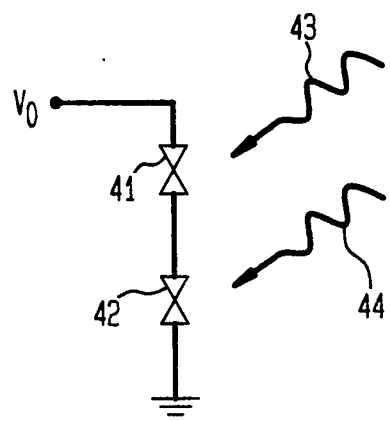
FIG. 4 is a schematic circuit diagram of a preferred further embodiment of the invention.

As described, the direction of optically triggered switching depends on the bias conditions. To provide for switching in either direction at a constant bias voltage, an arrangement is suggested as shown in FIG. 4 which shows first and second preferred resonant-tunneling structures 41 and 42 in electrical series connection and subject to an over-all bias voltage $V_0$. Light beams 43 and 44 are shown incident on respective structures 41 and 42.

Figure 5:
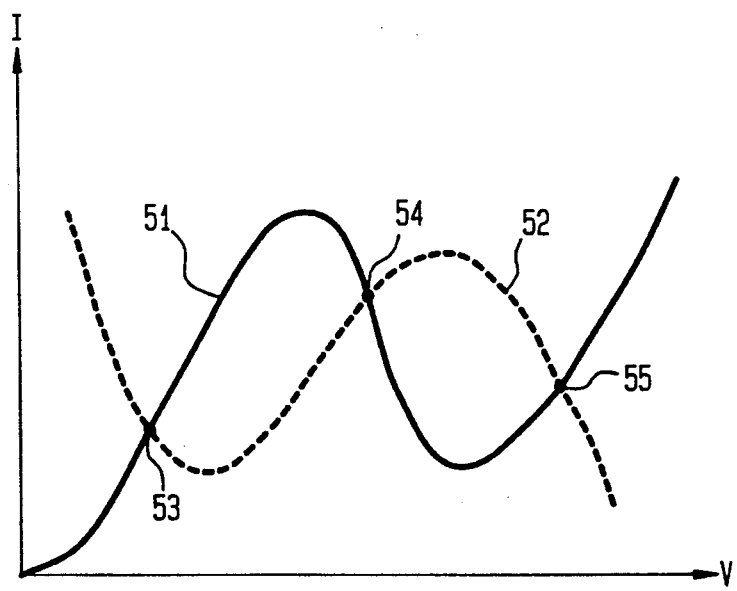
FIG. 5 is a representative current-voltage diagram for the structure of FIG. 4.

FIG. 5 shows current-voltage characteristic 51, corresponding, e.g., to device 41 of FIG. 4. Further shown is curve 52 which can be interpreted as a load line corresponding to device 42 of FIG. 4, and which intersects curve 51 in points 53, 54, and 55. In combination with the description of FIG. 3 above, FIG. 4 and 5 make it apparent that a suitable light pulse 43 on device 41 will result in switching from point 53 to point 55, and that a suitable light pulse 44 on device 42 will result in switching from point 55 to point 53.

Switching was experimentally ascertained with a structure similar to the structure of FIG. 1, except that barrier layers had a thickness of approximately 2.5 nanometers, the quantum-well layer had a thickness of approximately 6 nanometers, and mesa diameter was approximately 30 micrometers. Sample resistance was approximately 50 ohms. The structure was biased at different voltages through a 50-kilo-ohm resistor. With a bias voltage of approximately 0.8 volt, close to intrinsic switching, a minimum-energy light pulse of as little as 1 nanojoule optical energy was sufficient to initiate switching. It is estimated that approximately 5 percent of incident light is absorbed in the sample, so that optical switching energy is estimated to be approximately 50 picojoules. (This energy may be physically sufficient in a waveguide configuration in which essentially all incident light is absorbed.) Switching was triggered with a picosecond light pulse focussed onto a 15-micrometer region at the center of the mesa structure, and a photocurrent technique was used to determine switching time. Measured switching times of approximately 40 picoseconds are believed to be parasitically limited. Switching times are essentially independent of the initial bias conditions and the intensity of light used.

Figure 6:
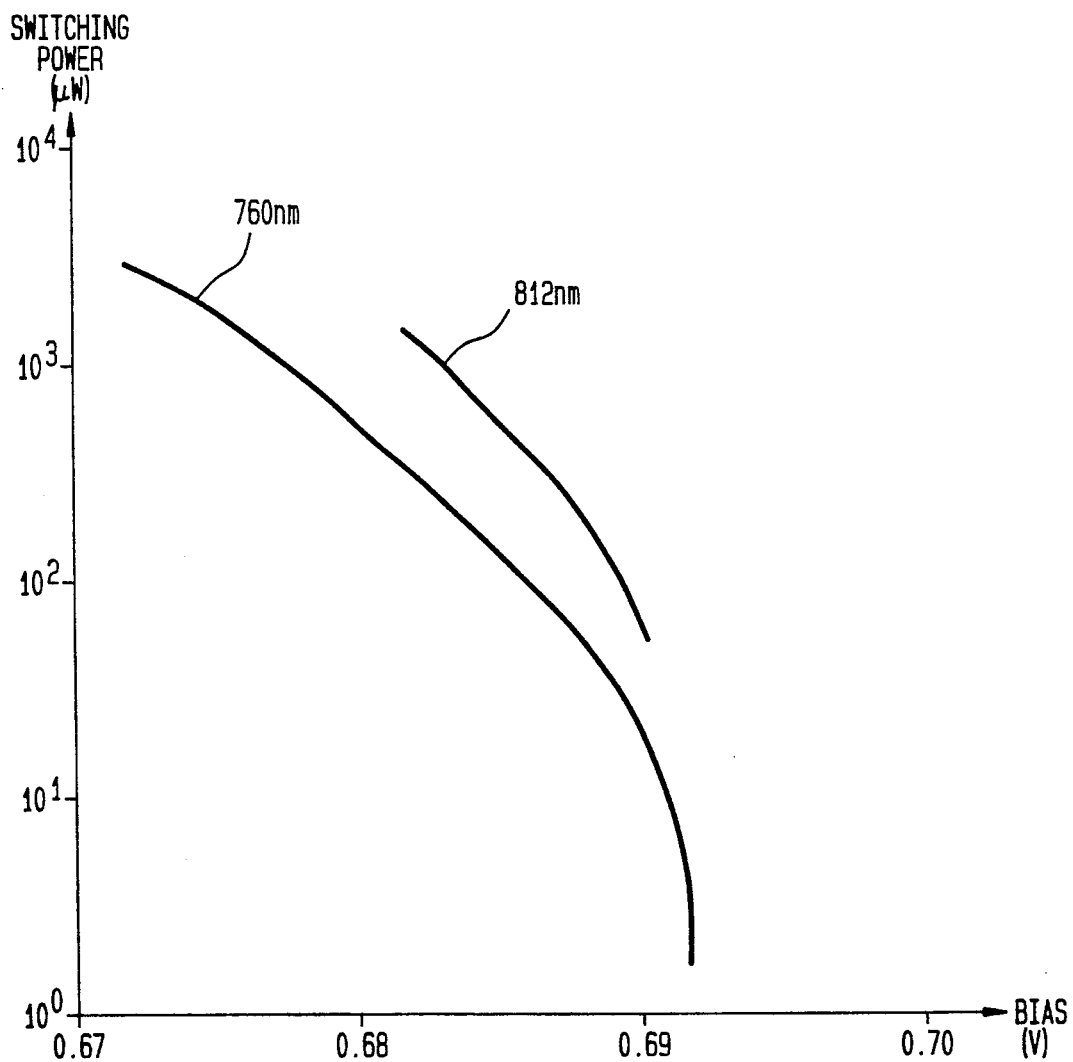
FIG. 6 is a graphical representation of an experimentally determined functional relationship between bias voltage and optical power needed for switching between two stable states of a structure in accordance with FIG. 1.

The dependence of switching power on bias voltage is illustrated in FIG. 6 for two wavelengths: 760 nanometers and 812 nanometers for the device of FIG. 1. Source impedance was approximately 1 kilo-ohm, and switching was from a high-current to a low-current state. It can be seen that required optical power increases rapidly away from the intrinsic switching voltage. Also, greater power is required in the case of the longer-wavelength pulses (as may be due to lesser optical absorption at this wavelength.) In view of the sensitivity of power required, it is apparent that, for switching, the optical beam does not have to generate an electrical charge equal to the voltage change across the structure multiplied by the device capacitance. Rather, it is suggested that a small amount of photocurrent or photocharge is sufficient to perturb the structure to draw the charge necessary for switching from the bias circuitry.

Figure 7:
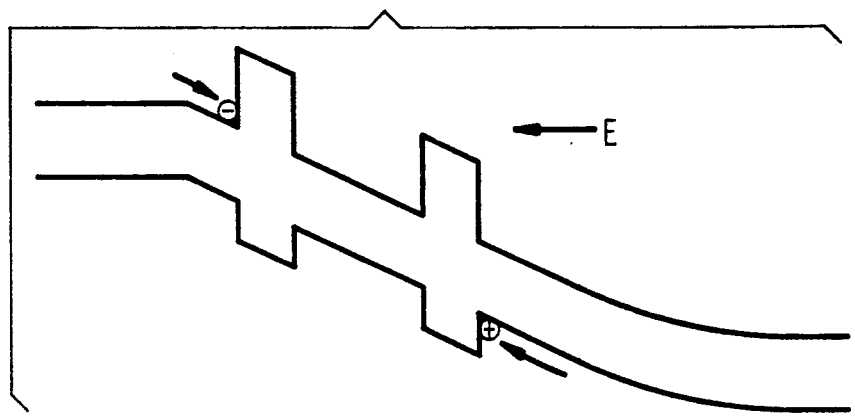
FIG. 7 is a representative energy-band diagram of a resonant-tunneling structure under electrical bias.

A suggested switching mechanism is illustrated by FIG. 7 which shows photo-generated electrons (−) and holes (+) having moved up against the resonant tunneling structure under the influence of a bias field E. If, in the dark, the field results in biasing at a stable point, the presence of these carriers may locally and temporarily increase the field strength to an unstable point and thereby induce switching.

Figure 8:
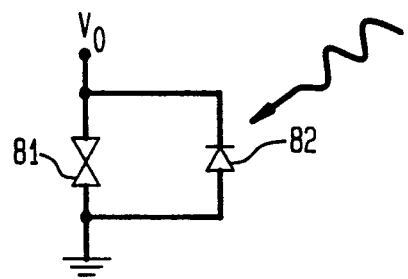
FIG. 8 is a schematic cross section of a preferred further embodiment of the invention.

Another mechanism which may be relied on for switching requires the inclusion of a resistive (and possibly photosensitive) element in a device structure or in an external circuit. For example, in an n-i-n structure as shown in FIG. 1, such element may be included in the form of a layer 18, on the injector side, n-doped at $n = 10^{17}/cm^3$ or less, and having increased thickness, e.g., in a range from 100 to 500 nanometers. Then, under illumination, photocharge generated in and around layer 18 will result in a photocurrent, and thereby in a voltage change across layer 18. If the structure is voltage-biased by an external circuit, voltage will also change across the resonant-tunneling structure, and this change may cause switching. For switching in the opposite direction, a photosensitive element, e.g., a photoresistive element or a reverse-biased photodiode 82 may be included in parallel to a resonant-tunneling structure 81 as shown in FIG. 8. Under suitable conditions, illumination of photodiode 82 will result in a voltage change across structure 81, inducing switching.

Figure 9:
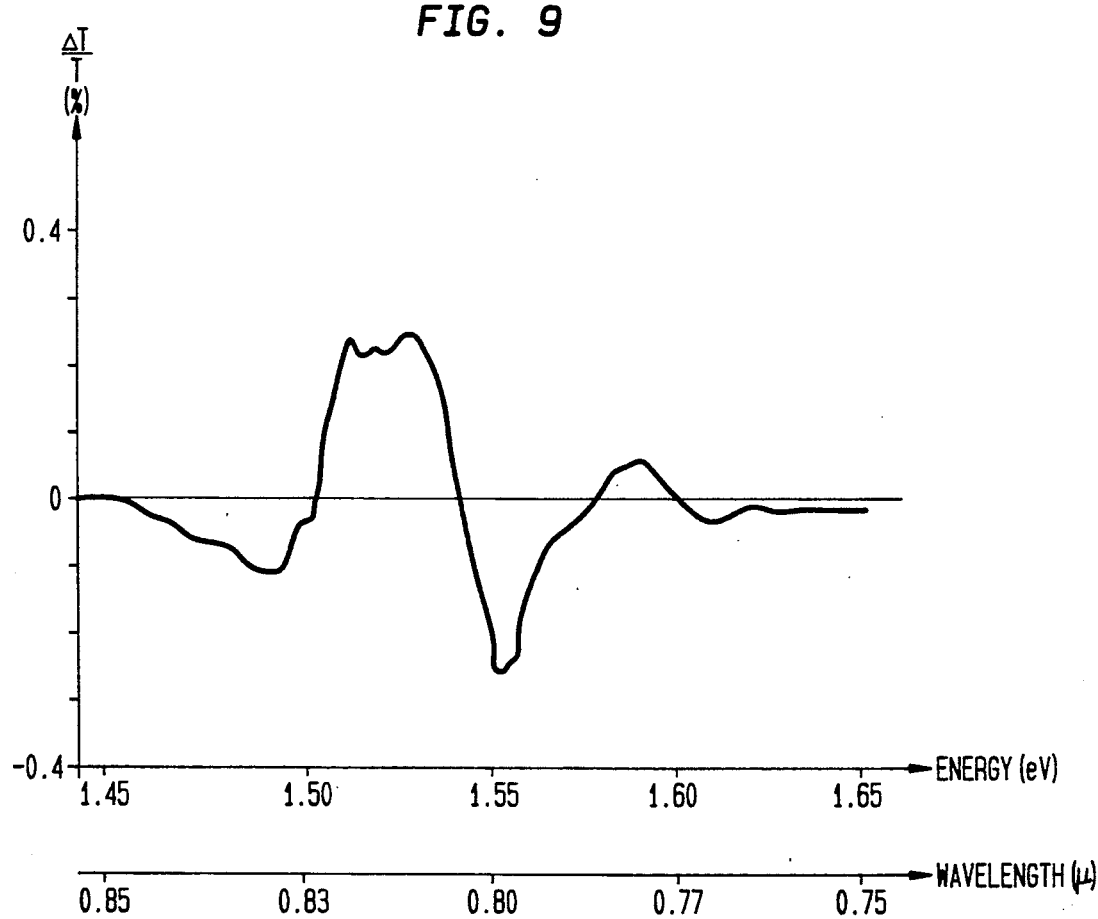
FIG. 9 is a graphic representation of an experimentally determined functional relationship between relative transparency difference and wavelength, the difference being between two stable states of a device in accordance with FIG. 1.

Switching is accompanied by a change in the optical absorption spectrum of the structure so that, as a function of wavelength, the resonant-tunneling structure may be more opaque in the state corresponding to point 33 as compared with the state corresponding to point 35 or vice versa. This is illustrated by FIG. 9 which shows, as a function of wavelength, the relative transparency difference between such two states of a structure in accordance with FIG. 1. Transparency difference can be understood as resulting from opacity changes due to Stark-shifting of quantum-well states by different amounts. Moreover, as understood in view of the Kramers-Kronig relationship (which relates refractive index change to transparency change), switching is accompanied by a change in the refractive index, and this change, too, may be used for device operation. For optical detection of the device state, a "probe beam" can be used at the same or a different wavelength as compared with that of a "programming beam" used for switching. In the former case, preferred intensity of a (time-delayed) probe beam is less than the threshold intensity required for switching. Programming and probe beams may also be distinguished by their polarization, e.g., by mutually perpendicular polarization or by left- and right-circular polarization. The direction of incidence of programming and probe beams is not critical.

Figure 10:
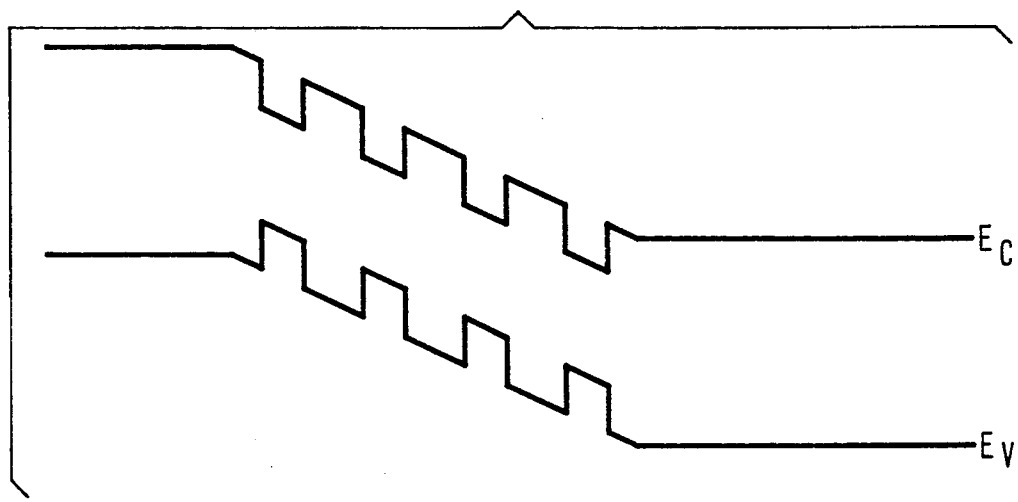
FIG. 10 is a representative energy-band diagram of a prior-art quantum-well structure.
Figure 11:
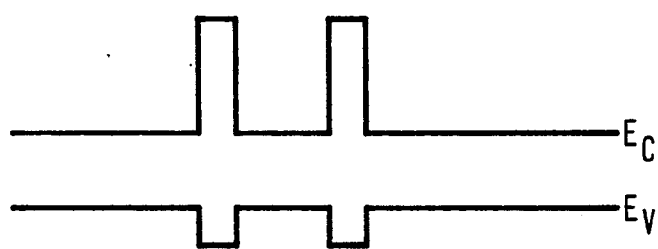
FIG. 11 is a representative energy-band diagram of a preferred resonant-tunneling structure in accordance with the invention.

Energy-band diagrams of FIG. 10 (corresponding to a prior-art SEED device structure) and FIG. 11 (representative of structures preferred in accordance with the present invention) graphically illustrate, e.g., a difference with respect to the bandgap of semiconductor material adjacent to quantum-well structures, such bandgap being wide for the SEED device, and relatively narrow for the invention. As a result, while carriers can move across the prior-art structure without interacting with a quantum state, carrier transport in the resonant-tunneling structure necessarily involves such interaction. Of course, even in the case of a resonant-tunneling structure there will be some thermionic emission without interaction with a quantum state. However, thermionic emission of as little as 1 percent of total carrier transport has been achieved even at room temperature, and useful device operation may be realized at thermionic emission levels of up to 10 percent or more.

Figure 12:
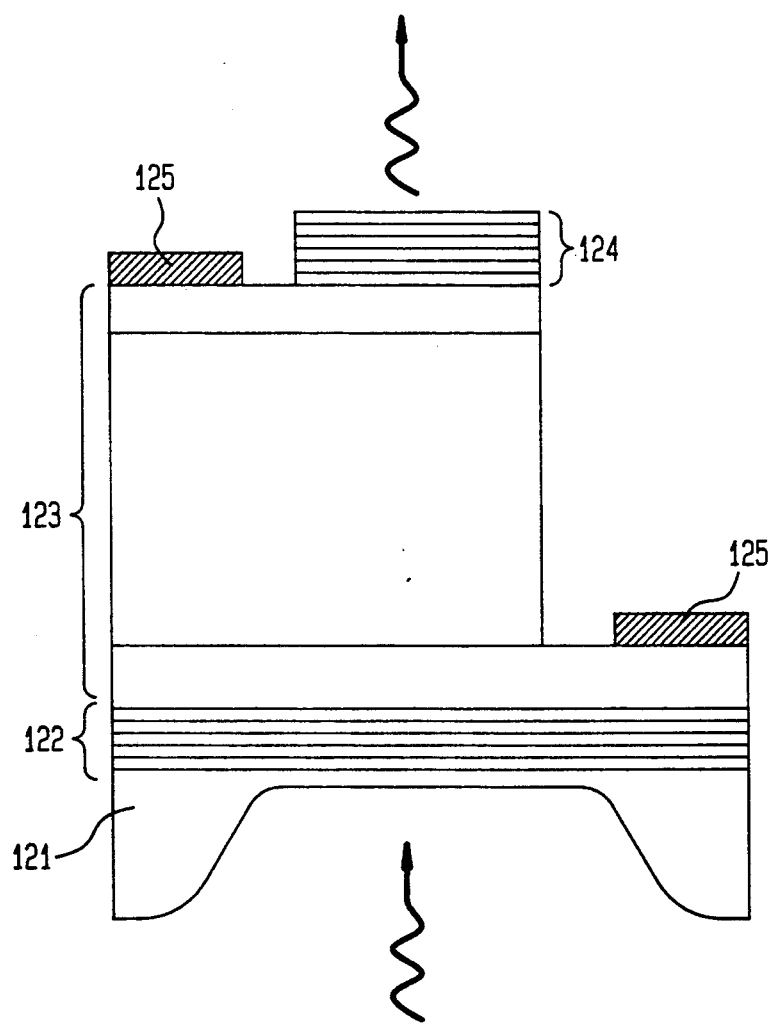
FIG. 12 is a schematic cross section of an optical multi-pass arrangement for enhancing optical interaction in accordance with a preferred further embodiment of the invention.

In the interest of cumulating transparency differences produced upon switching, a device may provide for multiple passes of optical radiation across a resonant-tunneling structure. Such a device is illustrated by FIG. 12 which shows, on substrate 121, a first set 122 of interleaved gallium arsenide, aluminum gallium arsenide layers, a structure 123 corresponding to layers 11 through 21 of FIG. 1, a second set 124 of interleaved gallium arsenide, aluminum gallium arsenide layers, and contacts 125. With quarter-wave (lambda/4) optical thickness of the interleaved layers, sets 122 and 124 form distributed (Bragg) reflectors, and the structure represents an etalon in which entering light is reflected back and forth across structure 123 before being emitted. As a result, a small opacity difference in structure 123 can produce a large cumulative difference in intensity levels between incident and transmitted light.

Figure 13:
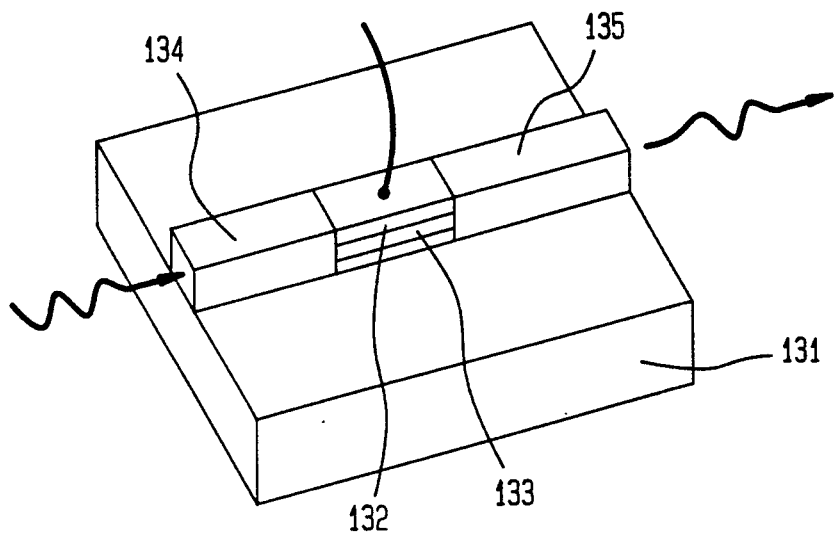
FIG. 13 is a schematic perspective view of an integrated-optics waveguide assembly in accordance with a preferred further embodiment of the invention.
Figure 14:
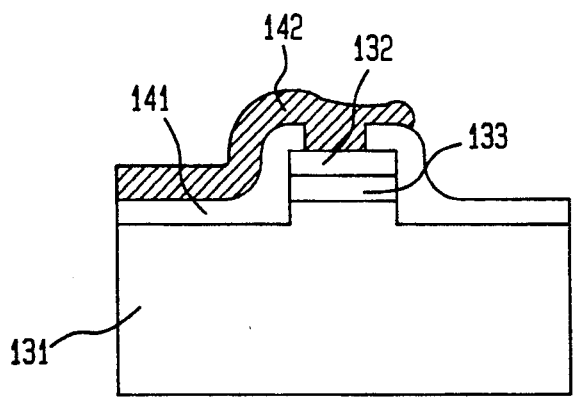
FIG. 14 is a schematic cross section of an assembly similar to the assembly of FIG. 13.

Alternatively, for the sake of enhanced interaction, a structure may be designed in waveguide geometry, with light traveling parallel to the layered structure. For example, as shown in FIG. 13, an electrically contacted resonant-tunneling structure 133 may be included in a rib waveguide 132 on a substrate 131, optionally with adjoining (passive) waveguides 134 and 135. In manufacture, a contact may be made as depicted in FIG. 14, with contact metal 142 formed after deposition and localized etching of insulating layer 141 on a structure otherwise like that of FIG. 13.

Figure 15:
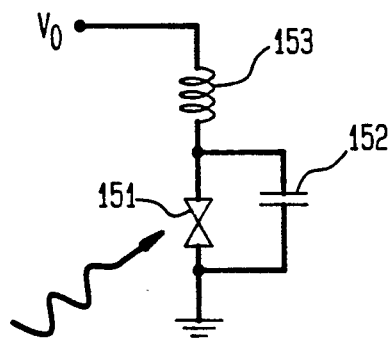
FIG. 15 is a circuit diagram of an oscillator circuit in accordance with a preferred further embodiment of the invention.

FIG. 15 shows a resonant-tunneling structure 151, e.g. as shown in FIG. 1, a capacitor 152, and an inductor 153 connected to form an LC-circuit. While, in the absence of illumination, this circuit will oscillate at a fundamental frequency, it was found that impulsive illumination of structure 151 can be used to synchronize the circuit oscillations with those of a train of light pulses. For example, under illumination with pulses from a mode-locked laser at 82 megahertz, it was possible to produce frequency halving, as well as ratios of 7/4, 1/6, and 13/7 between the laser frequency and the electrical oscillator frequency. Applications of this aspect lie, e.g., in light pulse division and pulse selection, possibly using cascaded circuits.

Figure 16:
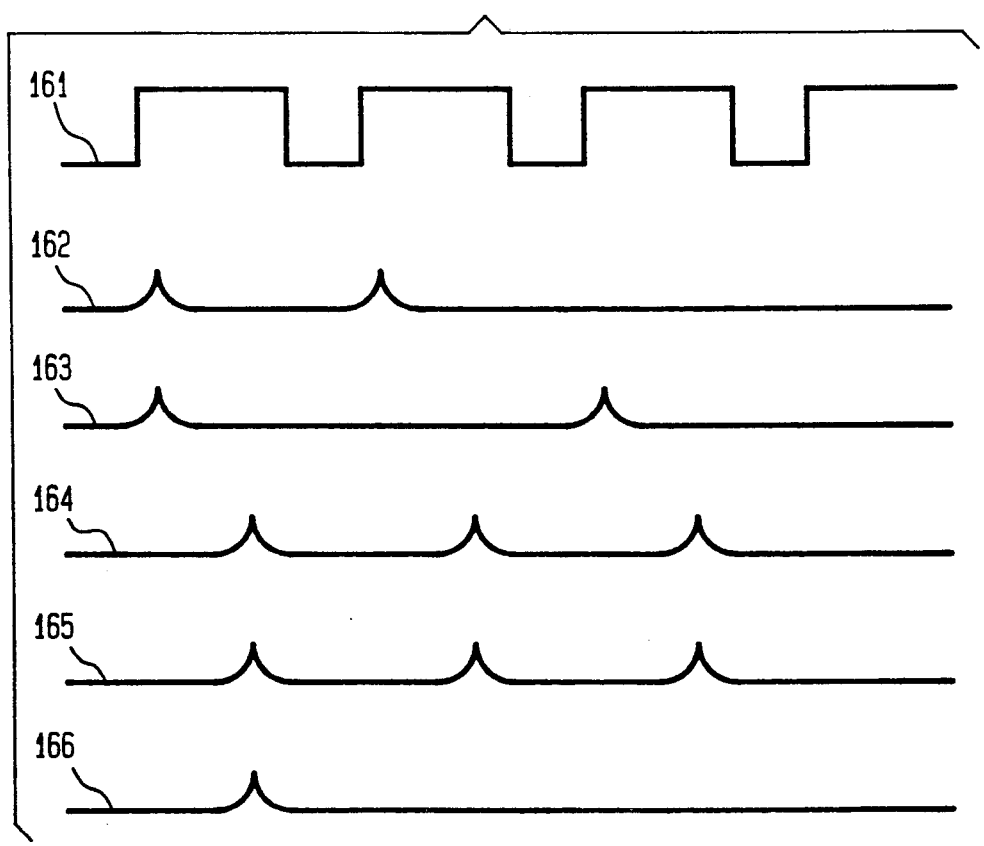
FIG. 16 is a schematic diagram illustrating logical gate operation in accordance with a preferred further embodiment of the invention.

FIG. 16 shows a train of electrical clock pulses 161 as may be applied between electrodes 22 of FIG. 1. Shown further are two synchronized trains of optical input pulses 162 and 163, as well as a probe input pulse 164 which is time-delayed with respect to trains 162 and 163. Shown finally are probe output pulses representing the logical sum (OR function) and the logical product (AND function). Under the assumption that, in the absence of a bias voltage, the resonant-tunneling structure is in an opaque state, and that optical pulse trains 162 and 163 are such that optical pulse intensity individually is sufficient for device switching, probe output signal 165 will be produced. If, on the other hand, individual pulse intensity in trains 162 and 163 is insufficient for switching but sufficient when combined, probe output pulse 166 will be realized.

Other than in an n-i-n layered structure as shown in FIG. 1, preferred light-sensitive structures in accordance with the invention may be included, e.g., in p-i-p, p-i-n, or n-n-n layered structures. Further variations include differences in composition and/or thickness between the barrier layers; indeed, different barriers may be preferred in the interest of equalizing barrier transmissivity under electrically biased operating conditions. And finally, while specifically described devices are two-terminal devices, the inclusion of additional electrodes is not precluded, e.g., to the quantum-well layer.

We claim:

1. An optical device comprising
   a substrate-supported layered semiconductor structure comprising a resonant-tunneling structure including a quantum-well layer between barrier layers,
   biasing means for electrically biasing said resonant-tunneling structure to have first and second respective stable electrical states, and
   first means for making first optical radiation having an optical intensity greater than a switching threshold to be incident on said layered semiconductor structure for causing switching between said first and second electrical states.

2. The device of claim 1, said first means being disposed for light incidence in a direction which is essentially perpendicular to said layered semiconductor structure.

3. The device of claim 1, said first means being disposed for light incidence in a direction which is essentially parallel to said layered semiconductor structure.

4. The device of claim 1, further comprising second means for making second optical radiation incident on said layered semiconductor structure.

5. The device of claim 4, said second means being disposed for light incidence in a direction which is essentially perpendicular to said layered semiconductor structure.

6. The device of claim 4, said second means being disposed for light incidence in a direction which is essentially parallel to said layered semiconductor structure.

7. The device of claim 4, said first and second means being adapted to produce light propagating in different directions.

8. The device of claim 4, said first and second means being adapted to produce light having different polarizations.

9. The device of claim 4, said first and second means being adapted to produce light having different wavelengths.

10. The device of claim 4, said first and second means being adapted to produce timed light pulses.

11. The device of claim 1, said first means being adapted for resonant electrical charge excitation into said resonant-tunneling structure.

12. The device of claim 1, said first means being adapted for electrical charge generation in a layer of said layered semiconductor structure adjacent to said resonant-tunneling structure.

13. The device of claim 1, further comprising means for sensing a change in an optical property of said resonant-tunneling structure.

14. The device of claim 13, said optical property being opacity.

15. The device of claim 13, said optical property being refractive index.

16. The device of claim 1, further comprising a resonant electrical circuit connected to said layered semiconductor structure.

17. A method of optical signal processing, comprising a step of making first optical radiation incident on a substrate-supported semiconductor structure which comprises a resonant-tunneling structure including a quantum-well layer between barrier layers, said resonant-tunneling structure being electrically biased to have first and second respective stable electrical states, and said radiation being of an intensity level greater than a switching threshold and adapted to cause switching of said structure between said first and second electrical states, and a step of sensing said first or second electrical state.

18. The method of claim 17 in which sensing is by electrical means.

19. The method of claim 17 in which sensing is by optical means.

20. The method of claim 17, further comprising a step of making second radiation incident on said semiconductor structure.

21. The method of claim 20, said first and second radiation individually being sufficient to cause switching.

22. The method of claim 20, said first and second radiation being sufficient for switching only in combination.

23. The method of claim 17 in which said electrical bias is clocked.

24. The method of claim 17, comprising a step of making radiation transmitted by said layered semiconductor structure incident on a further layered semiconductor structure comprising a resonant-tunneling structure.

25. The method of claim 17 in which said first optical radiation is pulsed, thereby causing electrical oscillation at a desired frequency in a resonant electrical circuit which has a fundamental frequency and which is connected to said semiconductor structure.

26. The method of claim 25 in which pulsing is at a frequency near a harmonic of said fundamental frequency.

27. The method of claim 25 in which pulsing is at a frequency near a subharmonic of said fundamental frequency.

28. The method of claim 25 in which pulsing is at a frequency which is near a frequency which is in a rational relationship with said fundamental frequency.

* * * * *